Patented Dec. 28, 1943

2,337,874

UNITED STATES PATENT OFFICE 2,337,874

RESINOUS COMPOSITION

Gaetano F. D'Alelio, Pittsfield, Mass., assignor to General Electric Company, a corporation of New York No Drawing. Application February 17, 1940, Serial No. 319,516

15 Claims. (Cl. 260—44)

The present invention relates broadly to resinous compositions and to methods of making the same. It is concerned more particularly with the production of compositions comprising a resinous reaction product of an alkaline-catalyzed partial condensation product of a phenol and an aliphatic aldehyde with a modified or unmodified acidic esterification product of a polyhydric alcohol and an alpha unsaturated alpha beta polycarboxylic acid, which esterification product has an acid number of at least 40 and not higher than 210.

The new materials produced in accordance with the present invention have valuable and characteristic properties that make them especially suitable for use in industry, for example in laminating, casting, coating and adhesive applications, and for other purposes. Fibrous laminae bonded together with the cured resins yield laminated articles exceptionally light in color as compared with products similarly made with the ordinary phenolic resins as bonding agents. The new resins also may be used as laminating adhesives in the production of plywood (a laminated wood product), in bonding wood veneers to base members of wood, metal, etc., for protectively coating impervious articles such as metals, e. g., iron or copper wire, for coating or coating and impregnating articles such as paper, cloth, glass fibers in felted, woven or other form, etc.

The resinous compositions of this invention are particularly useful as casting resins. The insoluble and infusible cast resins are capable of being machined and drilled easily, may be produced in clear, transparent and opaque forms and, in general, meet all the practical requirements of cast resins.

It has been known heretofore that alkyd-modified phenolic resins can be so prepared as to yield resinous compositions capable of being poured into molds, that is, cast, and cured therein under the influence of heat to the insoluble, infusible state. Casting resins so made are described, for example, in Kienle and Schlingman Patent No. 2,025,538, which is assigned to the same assignee as the present invention. In accordance with the Kienle and Schlingman invention a flexible alkyd resin is used as an acid catalyst in promoting reaction between a phenol and an aldehyde such as paraformaldehyde.

In the copending application of Edmond F. Fiedler, Serial No. 204,620, filed April 27, 1938, now Patent No. 2,233,406, and assigned to the same assignee as the present invention, is disclosed the fact that phenol alcohols may be caused to react with flexible alkyd resins having an acid number between 140 and 210 to give satisfactory casting resins. The permanently flexible alkyd resins permitted the production of shock-resistant castings because of the intrinsic flexibility of the alkyd component.

I have discovered that resinous compositions of particular utility as casting resins, impregnants, etc., can be produced by effecting reaction between a partial reaction product of a phenol and an aliphatic aldehyde, specifically formaldehyde or a polymeric modification of formaldehyde, and an acidic esterification product of a polyhydric alcohol with polycarboxylic acid, at least one such acid being essentially an alpha unsaturated alpha beta polycarboxylic acid. This esterification product (hereafter, for brevity, designated generally as an "unsaturated alkyd resin") should have pronounced acidity, as evidenced by an acid number of at least 40, but in no case should the acid, partial number be higher than 210. Such definitely acid esterification products are not to be confused with neutral or practically neutral ester bodies having acid numbers of the order of 0 to 20 or 25.

The unsaturated alkyd resins, examples of which are ethylene glycol maleate, diethylene glycol fumarate, glyceryl itaconate, triethylene glycol citraconate, etc., are convertible to the insoluble, infusible state through a process of double-bond polymerization. In cured state they are not permanently flexible even when prepared from a dibasic acid and a dihydric alcohol. Hence it was quite surprising and unexpected to find that by co-reacting a phenol-aldehyde partial condensation product with an acidic unsaturated alkyd resin having an acid number not higher than 210, there could be produced cured, shock-resistant cast resins having properties equal to, and in some respect better, than those obtained as disclosed and claimed in the above-identified Fiedler application.

In carrying the present invention into effect a phenol is caused to react, preferably under aqueous conditions, with an aliphatic aldehyde, specifically formaldehyde, in the presence of an alkaline catalyst to form a liquid mass comprising mainly alkylol phenols, specifically methylol phenols (phenol alcohols), or mixtures thereof. This reaction is carried out at normal or at elevated temperatures, usually under reflux at the boiling temperature of the mass.

The choice of the aliphatic aldehyde component is dependent largely upon economic considerations and upon the particular properties desired in the finished product. I prefer to use as the aldehydic component (and always for the production of casting resins) formaldehyde or polymeric modifications thereof such as the polyoxymethylenes, e. g., paraformaldehyde, trioxymethylene, etc. For some applications of the finished resin I may use other aliphatic aldehydes, for instance acrolein, acetaldehyde, propionaldehyde, butyraldehyde, crotonaldehyde, etc., mixtures thereof or mixtures of formaldehyde (or compounds engendering formaldehyde) with such aliphatic aldehyde. In general, the longer the chain of the aliphatic aldehyde, the softer is the final product.

Any phenol having aldehyde-reactive positions in the ring may be employed. The choice of the aldehyde-reactable phenolic body also depends upon economic considerations and the particular properties desired in the end-product. Thus, for the production of oil-soluble resins, I may use ortho- or para-substituted phenols such, for example, as disclosed in my copending application Serial No. 319,515, filed concurrently herewith and assigned to the same assignee as the present invention. For the production of casting resins I prefer to use a phenol having the graphic formula

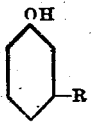

where R is a member of the group consisting of hydrogen, alkyl radicals (e. g., methyl, ethyl propyl, butyl, etc.), aryl radicals (e. g., phenyl, cresyl, etc.) and alkoxy radicals (e. g., methoxy, ethoxy, etc.).

The ratio of aliphatic aldehyde to phenol may be varied over a wide range, but preferably is within the ratio of 1 mol phenol to 1 to 4 or 5 mols aliphatic aldehyde. For producing casting resins I have obtained best results by using 1 mol phenol to approximately 1.5 to 3 mols formaldehyde. By varying the ratio of phenol to formaldehyde, the rate of cure and the strength of the final product may be varied.

The alkaline catalyst employed advantageously is one which has no darkening effect upon the resin. Hydroxides of the alkaline-earth metals (calcium, strontium and barium) and hydroxides, carbonates, cyanides and borates of the alkali metals (lithium, sodium, potassium, rubidium and caesium) are examples of suitable catalysts. The amount of catalyst may be considerably varied, but generally is about 0.5 to 5 per cent by weight of the phenolic body. The nearer the reaction temperature approaches 100° C., the less catalyst is required. At reaction temperatures of approximately 60° to 90° C. an amount of catalyst ranging from about 1 to 3.5 per cent by weight of the phenol usually is effective. The catalyst concentration generally will be somewhat lower, other conditions being the same, when hydroxides of the alkali metals are used, as compared with the corresponding alkali metal salts such as carbonates, cyanides and borates.

In producing casting resins the initial reaction temperature between the phenol and formaldehyde preferably is not permitted to exceed substantially 100° C. Otherwise the cured, unsaturated-alkyd-modified phenolic resin may be objectionably darkened.

The phenol and aliphatic aldehyde are intimately associated, for example by mixing and heating for a period sufficient to cause reaction therebetween but insufficient to cause complete separation of the mass into two distinct phases, that is, insufficient to form a distinct oily layer of the resinous condensation product. Thereafter an acidic unsaturated alkyd resin having an acid number not higher than 210 is incorporated into the liquid, resinous phenol aliphatic aldehyde partial condensation product and the mixed components are caused to react further, preferably at a temperature not exceeding substantially 110° C., thereby to form a potentially reactive resinous composition capable of converting under heat to an insoluble, infusible state.

The acidic unsaturated alkyd resin is separately prepared, that is, preformed, in accordance with technique now well known to those skilled in the alkyd resin art. Any polyhydric alcohol containing at least two esterifiable aliphatic hydroxyl groups, or mixtures of such alcohols, may be used in preparing the unsaturated alkyd resin. Examples of such polyhydric alcohols are ethylene glycol, di-, tri- and tetraethylene glycols, propylene glycol, trimethylene glycol, thiodiglycol, glycerine, pentaerythritol, etc. Any alpha unsaturated alpha beta polycarboxylic acid, or mixtures of such acids, may be reacted with the polyhydric alcohol or alcohols to form the unsaturated alkyd resin. Examples of such polycarboxylic acids are maleic, monohalomaleic, fumaric, monohalofumaric, citraconic, mesaconic, acetylene dicarboxylic, aconitic, itaconic and its homologues as, for instance, alpha methyl itaconic acid, alpha ethyl itaconic acid, alpha alpha dimethyl itaconic acid, etc. If available, anhydrides of these polycarboxylic acids may be employed.

The components are mixed and incompletely reacted in an inert gaseous atmosphere, such as a nitrogen atmosphere, until an acidic unsaturated alkyd resin having alcoholic hydroxyl groups and an acid number not higher than 210 is obtained. Such a resin generally will be produced when the components have been reacted until from about 55 to 93 per cent of the theoretical water of esterification has been collected. Acidic unsaturated alkyd resins having an acid number higher than 210 should not be used, since a large excess of unreacted unsaturated alkyd resin components (indicated by an acid number above 210) has a detrimental effect upon the cured product.

In some cases, instead of using an unmodified unsaturated alkyd resin I may use an acidic unsaturated alkyd resin which has been internally modified by replacing a part, say up to about 75 mol per cent of the alpha unsaturated alpha beta polycarboxylic acid with a non-ethylenic polycarboxylic acid, e. g., a saturated aliphatic polycarboxylic acid such as succinic, adipic, glutaric, pimelic, sebacic, azelaic, suberic, tricarballylic, tartaric, citric, etc., cyclic polycarboxylic acids, more specifically the saturated cycloaliphatic polycarboxylic acids such as the cyclopropane dicarboxylic acids, the cyclohexane dicarboxylic acids, the alkyl cycloalkane polycarboxylic acids, etc., and the aromatic polycarboxylic acids, e. g., phthalic, benzoyl phthalic, terephthalic, benzophenone-2,4' dicarboxylic acids, etc., or with anhydrides of such acids if available. The thus modified acidic unsaturated alkyd resin, the polycarboxylic acid component of which contains at least 25 mol per cent alpha unsaturated alpha beta polycarboxylic acid, likewise should have an acid number not higher than 210.

The term "unsaturated alkyd resin" as used generally herein and in the appended claims is intended to include within its meaning both unmodified esterification products of a polyhydric alcohol with an alpha unsaturated alpha beta polycarboxylic acid and esterification products of the said components which have been modified with a non-ethylenic polycarboxylic acid such as above described. The terms "polycarboxylic acid" and "dicarboxylic acid" as used generally herein and in the appended claims are intended to include within their meaning the known anhydrides of the acids.

As is well known, when a phenol and an aliphatic aldehyde are caused to react under alkaline conditions a phenol alcohol forms first. As the reaction proceeds, a condensation product that at first causes the mass to become milky or opalescent is produced. If the reaction is allowed to proceed further a separation of the mass into an aqueous layer and a thick, syrupy, oily resinous layer takes place. In carrying the present invention into effect a soluble, acidic unsaturated alkyd resin of not higher than 210 acid number may be incorporated with the phenolic reaction product when the latter is in the form of a clear solution comprising mainly a mixture of phenol alcohols. Or, the unsaturated alkyd resin may be added to the phenolic resinous mass when the phenol-aldehyde partial condensation product is dispersed through the mass to produce translucent to opaque effects when hot.

In all cases the unsaturated alkyd resin is incorporated into the phenolic reaction product before the formation of the above-described oily layer, since the soluble, acidic unsaturated alkyd resins are more compatible with the phenol alcohols and the initial phenol-aldehyde condensation products than with the more highly polymerized and condensed phenolic resins. The mixed components then are reacted further. The mixture may be heated for a short time prior to dehydration or immediately may be dehydrated. In the latter case the phenol-aldehyde partial condensation product and the unsaturated alkyd resin co-react simultaneously with the dehydration of the resinous mass.

The amount of unsaturated alkyd resin incorporated into the phenol-aldehyde initial reaction product may be varied over a wide range. The optimum proportion of unsaturated alkyd resin to phenolic resin depends upon such influencing factors as, for example, the particular starting components and proportions thereof employed in the production of the unsaturated alkyd resin and the phenolic resin, the particular reaction time and temperatures and the particular properties desired in the end-product. However, generally speaking the unsaturated alkyd resin component will be not more than 75 per cent by weight of the dehydrated or cured resinous mass and, for casting resin applications, will be not more than 50 per cent by weight thereof. In most cases casting resins produced in accordance with this invention are constituted of unsaturated alkyd resin in an amount corresponding to from 5 to 45 per cent by weight of the dehydrated or cured resinous mass. Particularly good results have been obtained with, by weight, from 5 to 30 per cent unsaturated alkyd resin to 95 to 70 per cent phenolic resin based on the dehydrated mass. In general, the harder it is desired that the cured resin should be, the less the amount of unsaturated alkyd resin used.

When a strong base in relatively large amount is employed as a catalyst for the phenol-aldehyde reaction, it is sometimes advantageous to use less acidic unsaturated alkyd resin than would be required to neutralize completely the alkalinity of the phenolic reaction product. In such cases neutralization is completed by adding a suitable amount of an organic carboxylic acid such as acetic, propionic, oxalic, malonic, succinic, adipic, acrylic, methacrylic, polymethacrylic, maleic, fumaric, citraconic, tartaric, citric, lactic, hydroxy malonic, etc. In this way the amount of acidic unsaturated alkyd resin required for neutralization may be materially reduced.

For casting resin application, but not necessarily for other uses of the resin, it is important that the temperature of dehydrating the unsaturated alkyd-phenolic resin intercondensation product does not exceed substantially 110° C. Preferably the mass is so dehydrated under reduced pressure that the maximum temperature attained is not higher than 90° or 95° C. If a temperature of 110° is attained during dehydration, the cured resin may form star cracks in the cast object. Such cracks are objectionable from the standpoint both of appearance and maximum strength of the casting. If the maximum temperature of dehydration is, say 100° C., the cured product will be darker than if the maximum is, for example, 70° or 80° C.

During the process of curing the cast resins of this invention in molds the resin temperature should not exceed substantially 110° C. The higher the cure temperature, the more rapid the cure but the darker is the cured product. Best results are obtained by curing at a temperature which does not exceed substantially 100° C. and which preferably is of the order of 75° to 90° C. Lower curing temperatures, for example 60° to 70° C. may be used, but the curing process then proceeds much more slowly.

When the resinous compositions of this invention are used in laminating and adhesive applications, the resin may be cured in situ at much higher temperatures, for example at temperatures of the order of 130° or 140° C. At such temperatures the soluble, fusible resinous mass is converted to the insoluble, infusible state in about 30 to 60 minutes.

When it is desired to color the resin a suitable dye or pigment is added, preferably shortly before or immediately after the completion of the dehydration step and while the resin is still in the reaction vessel.

In order that those skilled in the art better may understand how the present invention may be carried into effect, the following examples thereof are given by way of illustration:

EXAMPLE 1

| | Parts by weight |
|---|---|
| Phenol | 90.0 |
| Aqueous solution of formaldehyde (approximately 37.1% HCHO) | 161.0 |
| Sodium hydroxide in 5 parts water | 0.9 |
| Acidic ethylene glycol maleate (acid number below 210) | 40.0 |

The phenol formaldehyde solution and sodium hydroxide solution were mixed and heated together under reflux at boiling temperature (approximately 94° to 98° C.) for a period insufficient to cause separation of the mass into two distinct phases or layers, specifically for 45 minutes. To the resulting resin syrup were added 40 parts of acidic ethylene glycol maleate obtained by reacting 62 parts (1 mol) ethylene glycol and 98 parts (1 mol) maleic anhydride in a nitrogen atmosphere for ½ hour at 180° to 190° C., during which time 70 per cent of the calculated water of esterification was collected. After thoroughly mixing the ethylene glycol maleate with the phenolic resin, the mass was dehydrated under a vacuum of 26.5 inches of mercury. During dehydration the resinous mass reached a maximum temperature of 92° C. The hot resin was poured into molds and cured therein at approximately 85° C. for 72 hours. The cured articles were hard, tough and exceptionally light-colored, having the visual appearance of opalescent glass.

EXAMPLE 2

*Preparation of phenolic resin*

| | Parts by weight |
|---|---|
| Phenol | 94 |
| Aqueous solution of formaldehyde (approximately 37.1% HCHO) | 161 |
| Sodium hydroxide in 10 parts water | 1 |

The above components were mixed and heated under reflux at boiling temperature (approximately 94° to 98° C.) for 30 minutes. The resulting liquid mass was a clear, homogeneous solution comprising mainly a mixture of phenol alcohols.

| | Parts by weight |
|---|---|
| Phenol-formaldehyde partial condensation product prepared as described above | 25.0 |
| Acidic ethylene glycol itaconate (acid number below 210)[1] | 2.3 |

[1] The acidic ethylene glycol itaconate was produced by reacting 62 parts (1.0 mol) ethylene glycol with 130 parts (1 mol) itaconic acid in a nitrogen atmosphere for 1½ hours at approximately 180° to 195° C., during which time 93 per cent of the calculated water of esterification was collected.

The acidic ethylene glycol itaconate was thoroughly mixed with the phenolic resin, yielding a mass which was slightly acid to litmus. This mass was dehydrated under a vacuum of 4 mm. mercury, the temperature being 30° C. at the end of the dehydration period. A clear, viscous resin was obtained. This resin was poured into a mold and cured therein at approximately 100° C. for 48 hours, yielding a hard, tough, amber-colored opaque casting.

EXAMPLE 3

Same formula as in Example 2 with the exception that 12 parts, instead of 2.3 parts, of ethylene glycol itaconate were mixed and caused to react with the phenolic resin. The mixed components were dehydrated under a vacuum of 4 mm. mercury, the temperature reaching a maximum of 70° C. during dehydration. The dehydrated mass was a clear, pink-colored resin which was cast and cured at 100° C. for 48 hours, yielding a hard, almost transparent, amber-colored casting.

EXAMPLE 4

Same formula as in Example 2 with the exception that 5 parts ethylene glycol itaconate were used. The mixture of phenolic resin and acidic ethylene glycol itaconate was dehydrated under a vacuum of 2 mm. mercury, the temperature being 40° C. at the end of the dehydration period. The resulting clear, viscous resin was poured into a mold and cured therein at 100° C. for 48 hours. The cured resin was hard, opaque and of an amber color.

EXAMPLE 5

| | Parts by weight |
|---|---|
| Phenol-formaldehyde partial condensation product prepared as described under Example 2 | 69 |
| Acidic ethylene glycol itaconate (acid number below 210)[1] | 9 |

[1] The acidic ethylene glycol itaconate was prepared by reacting 47 parts (1.5 mols) ethylene glycol with 65 parts (1 mol) itaconic acid in a nitrogen atmosphere for ½ hour at 185° to 195° C., during which time 83 per cent of the theoretical water of esterification was collected.

The above components were mixed and the mixture dehydrated under a vacuum of 30 mm. mercury. During dehydration the resinous mass reached a maximum temperature of 105° C. A viscous resin of water-white clarity was obtained. A sample of this resin cured in a mold after 6 weeks' heating at about 60° C. to a rubbery, white, opaque state. Another sample formed a hard, white, opaque resin after heating for 10 days at 90° C. in a mold.

EXAMPLE 6

| | Parts by weight |
|---|---|
| Phenol-formaldehyde partial condensation product prepared as described under Example 2 | 25.0 |
| Acidic glyceryl itaconate (acid number below 210)[1] | 1.65 |

[1] The acidic glyceryl itaconate was prepared by reacting 62 parts (0.67 mol) glycerine with 130 parts (1 mol) itaconic acid in a nitrogen atmosphere for ½ hour at 180° C., during which time 55 per cent of the calculated water of esterification was collected.

The above components were mixed and the mixture dehydrated under a vacuum of 6 mm. mercury, the temperature being 40° C. at the end of the dehydration period. The resulting clear, viscous resin was poured into a mold and cured therein at 90° C. for 60 hours. The cured resin was hard, opaque and of an amber color.

EXAMPLE 7

| | Parts by weight |
|---|---|
| Phenol-formaldehyde partial condensation product prepared as described under Example 2 | 25 |
| Acidic glyceryl itaconate (acid number below 210) prepared as described under Example 6 | 5 |

The mixed components were dehydrated under a vacuum of 5 mm. mercury, the temperature being 60° C. at the end of the dehydration period. The resulting clear, viscous resin was cured in a mold at 90° C. for 60 hours, yielding a hard, translucent, amber-colored resin.

EXAMPLE 8

| | Parts by weight |
|---|---|
| Phenol-formaldehyde partial condensation product prepared as described under Example 2 | 25 |
| Acidic glyceryl itaconate (acid number below 210) prepared as described under Example 6 | 12 |

The mixed components were dehydrated under a vacuum of 4 mm. mercury, the temperature being 60° C. at the end of the dehydration period. A clear, viscous resin was obtained. The hot resin was poured into a mold and cured therein at 90° C. for 60 hours, yielding a hard, clear cast resin.

Example 9

Preparation of phenolic resin

| | Parts by weight |
|---|---|
| Phenol | 47.0 |
| Aqueous solution of formaldehyde (approximately 37.1% HCHO) | 88.0 |
| Sodium hydroxide in 5 parts water | 0.48 |

The above components were mixed and heated under reflux at boiling temperature (approximately 94° to 98° C.) for 25 minutes, yielding a clear solution of initial phenol-formaldehyde condensation product. To the liquid resinous mass were added 70 parts acidic glyceryl itaconate (acid number below 210) prepared by reacting 60 parts glycerine (1.2 mols) and 65 parts itaconic acid (1 mol) in a nitrogen atmosphere first at 125° to 160° C. for 35 minutes and then at about 190° to 195° C. for about 20 minutes. The mixed components were heated under reflux at the boiling temperature of the mass for 40 minutes and then dehydrated under 26 to 28 inches vacuum until 40 parts water of reaction had been removed. The dehydrated resin was heated in a mold for 6 days at 70° C., yielding a slightly rubbery, tough mass.

Instead of effecting reaction between the phenol and aliphatic aldehyde as above described, that is, under reflux at the boiling temperature of the mass, the components may be reacted at room temperature (20° to 35° C.) or first at temperatures of the order of 50° to 60° C., followed by further reaction at room temperature. Reaction temperatures of, say, 70° to 85° C. also may be employed, in which case the reaction time generally will be between about one and two hours. The longer the reaction time at such temperature, the more viscous the resin becomes during subsequent dehydration. The casting of too viscous a resin has a tendency to yield a cured resin containing bubbles of entrapped gas. Higher or longer reaction temperatures require shorter or longer reaction periods to obtain dehydrated, potentially reactive, resinous materials of approximately the same viscosity.

To obtain light-colored products, materials of a high degree of purity should be used. The phenol should be a specially distilled material substantially free from bodies capable of imparting color to the cured resin. The catalyst should meet the specifications of the United States Pharmacopoeia for purity, or be of an equivalent grade. The purest available aliphatic aldehyde should be employed. The unsaturated alkyd resin should be almost water-white.

The properties of the cured resins can be varied considerably by varying the starting components and the proportions thereof. For example, the toughness and flexibility of the heat-hardened resin can be varied by using different polyhydric alcohol esters of alpha unsaturated alpha beta polycarboxylic acids. By using the longer chained polyhydric alcohols, e. g., diethylene glycol, triethylene glycol, etc., in preparing the acidic unsaturated alkyd resin component, the final product tends to be more flexible. Transparent as well as translucent or opaque effects may be produced by varying the formula and extent of dehydration.

The dehydrated resins before curing are sufficiently liquid that they may be poured without difficulty. Hence they may be used in coating, impregnating and similar applications without added solvent. They may be employed, for example, to impregnate paper-insulated layerwound coils which, after curing, are the equivalent of a molded coil. With or without solvents they may be used as impregnants for many porous bodies, such as cork, pottery, felts or fabricated bodies with interstices, netted fibers, interwoven fibrous materials, concrete, synthetic boards, etc.

Bubble-free cast resins of uniform characteristics from batch to batch can be produced in accordance with this invention. The rate of curing is comparable with, and in many cases better than that of casting resins produced by other methods and of different composition. The cured products are mechanically strong and of varying degrees of toughness, depending upon such factors as above set forth. The strength of the cured resin, as measured by breaking a ½-inch diameter by 5-inches long cylinder on a Charpy testing machine, ranges from about 0.7 foot pound to above the measuring capacity of the machine, which is 2 foot pounds. The cured cast resins of this invention are water-resistant, oil-insoluble and extremely resistant to ultra-violet light.

The liquid casting resins, with or without modifying agents, may be cast in any desired shape and molded under heat or under heat and pressure. They can be turned easily on a lathe, or drilled, without chipping or cracking, and may be employed to make a wide variety of useful articles. Examples of such articles are rods, sheets, tubes, clock cases, door knobs, telephone receiving sets, radio cabinets, vases and umbrella handles.

Specific examples of fillers and other modifying agents which may be incorporated into the resinous compositions of this invention prior to use are lignin, partially hydrolyzed wood, wood flour, alpha cellulose in flock form, sand, clays, asbestos, mica, paper, cloth, cellulose derivatives such as regenerated cellulose, cellulose esters, natural and synthetic filaments or fibers, etc., in continuous, shredded or comminuted form. Synthetic and natural resins, gums, oils, waxes, polyhalogenated aromatic derivatives, etc. likewise may be added as modifying agents. Plasticizers such as the alkyl phthalates, e. g., dibutyl phthalate, etc., higher alcohols, etc., may be used to condition the resinous mass. Pigments such as zinc sulfate, barium sulfate, titanium compounds such as the oxides, the phthalates, etc., may also be incorporated into the compositions.

In my copending application Serial No. 319,515, filed concurrently herewith and assigned to the same assignee as the present invention, I have disclosed and specifically claimed oil-soluble resinous compositions produced by reacting an acidic unsaturated alkyd resin having an acid number not higher than 210 with an alkaline-catalyzed partial condensation product of an aliphatic aldehyde with an ortho- or para- substituted phenol containing at least four carbon atoms in the substituent grouping and two reactive positions in the aromatic nucleus.

What I claim as new and desire to secure by Letters Patent of the United States is:

1. A composition comprising a dehydrated resinous reaction product of ingredients consisting of (1) a liquid alkaline-catalyzed partial condensation product of ingredients consisting of a phenol and an aliphatic aldehyde obtained by reacting said ingredients for a period sufficient to cause reaction therebetween but insufficient to cause complete separation of the reaction mass into two distinct phases with (2) a preformed acidic unsaturated alkyd resin compatible with the said condensation product and obtained by incomplete reaction of ingredients consisting of polyhydric alcohol and polycarboxylic acid, at least one such acid being essentially an alpha unsaturated alpha beta polycarboxylic acid forming at least 25 mol per cent of the polycarboxylic acid, said alkyd resin having an acid number of at least 40 and not higher than 210 and constituting from 5 to 75 per cent by weight of the said dehydrated reaction product.

2. A dehydrated resinous product of reaction of ingredients consisting of (1) a preformed acidic unsaturated alkyd resin obtained by incomplete reaction of ingredients consisting of polyhydric alcohol and polycarboxylic acid, at least one such acid being essentially an alpha unsaturated alpha beta polycarboxylic acid forming at least 25 mol per cent of the polycarboxylic acid, and (2) a liquid alkaline-catalyzed partial condensation product of ingredients consisting of formaldehyde and phenol obtained by reacting said ingredients for a period sufficient to cause reaction therebetween but insufficient to cause complete separation of the reaction mass into two distinct phases, said alkyd resin having an acid number of at least 40 and not higher than 210, being compatible with the said phenol-formaldehyde partial condensation product and constituting from 5 to 50 per cent by weight of the said dehydrated reaction product.

3. A composition as in claim 1 wherein the unsaturated alkyd resin is an acidic polyhydric alcohol itaconate having an acid number of at least 40 and not higher than 210.

4. A composition as in claim 1 wherein the unsaturated alkyd resin is an acidic polyhydric alcohol maleate having an acid number of at least 40 and not higher than 210.

5. A composition as in claim 1 wherein the unsaturated alkyd resin is an acidic polyhydric alcohol fumarate having an acid number of at least 40 and not higher than 210.

6. A heat-curable resinous product of partial reaction of ingredients consisting of (1) a liquid alkaline-catalyzed partial condensation product of ingredients consisting of phenol and formaldehyde obtained by reacting said ingredients for a period sufficient to cause reaction therebetween but insufficient to cause complete separation of the reaction mass into two distinct phases and (2) a preformed acidic unsaturated alkyd resin compatible with the said condensation product and obtained by incomplete reaction of ingredients consisting of polyhydric alcohol and alpha unsaturated alpha beta polycarboxylic acid, said alkyd resin having an acid number of at least 40 and not higher than 210 and constituting from 5 to 75 per cent by weight of the said resinous product in cured state.

7. A product comprising the cured resinous composition of claim 6.

8. A composition comprising the dehydrated resinous reaction product of ingredients consisting of (1) a phenol alcohol and (2) a preformed acidic unsaturated alkyd resin compatible with the phenol alcohol of (1) and obtained by incomplete reaction of ingredients consisting of polyhydric alcohol and polycarboxylic acid, at least one such acid being essentially an alpha unsaturated alpha beta polycarboxylic acid forming at least 25 mol per cent of the polycarboxylic acid, said alkyd resin having an acid number of at least 40 and not higher than 210 and constituting from 5 to 75 per cent by weight of the said dehydrated resinous reaction product.

9. A dehydrated resinous reaction product of ingredients consisting of (1) a preformed acidic unsaturated alkyd resin obtained by incomplete reaction of ingredients consisting of polyhydric alcohol and an alpha unsaturated alpha beta polycarboxylic acid and (2) a liquid alkaline-catalyzed partial condensation product of ingredients consisting of 1 mol of a phenol and from 1 to 5 mols of an aliphatic aldehyde obtained by reacting said ingredients for a period sufficient to cause reaction therebetween but insufficient to cause complete separation of the reaction mass into two distinct phases, said alkyd resin being compatible with the condensation product of (2), having an acid number of at least 40 and not higher than 210 and constituting from 5 to 50 per cent by weight of the said dehydrated reaction product.

10. A casting resin adapted to be cured within the temperature range of 60° to 110° C., said resin being the clear, viscous, resinous partial reaction product of ingredients consisting of (1) a preformed acidic unsaturated alkyd resin obtained by incomplete reaction of ingredients consisting of polyhydric alcohol and polycarboxylic acid, at least one such acid being essentially an alpha unsaturated alpha beta polycarboxylic acid forming at least 25 mol per cent of the polycarboxylic acid, and (2) a liquid alkaline-catalyzed partial condensation product of ingredients consisting of approximately 1.5 to 3 mols formaldehyde with 1 mol of phenol obtained by reacting said ingredients for a period sufficient to cause reaction therebetween but insufficient to cause complete separation of the reaction mass into two distinct phases, said alkyd resin having an acid number of at least 40 and not higher than 210, being compatible with the said phenol-formaldehyde partial condensation product, and constituting from 5 to 30 per cent by weight of the said casting resin in cured state.

11. The cured casting resin of claim 10, said resin being machinable and drillable without chipping or cracking, and being further characterized by its freedom from bubbles, oil-insolubility and resistance to water and ultra-violet light.

12. A composition comprising the dehydrated resin obtained by reaction during dehydration of a mixture of ingredients consisting of (1) a liquid partial condensation product of ingredients consisting of phenol and an aldehyde comprising mainly phenol alcohols and (2) a preformed acidic unsaturated alkyd resin obtained by incomplete reaction of ingredients consisting of a dihydric alcohol and an alpha unsaturated alpha beta polycarboxylic acid, said alkyd resin having an acid number of at least 40 and not higher than 210, being compatible with the said liquid mass of (1) and constituting from 5 to 30 per cent by weight of the said dehydrated resin.

13. A dehydrated resinous product of reaction of ingredients consisting of (1) a liquid alkaline-catalyzed partial condensation product of ingredients consisting of a phenol and an aliphatic aldehyde obtained by reacting said ingredients for a period sufficient to cause reaction therebetween but insufficient to cause complete separation of the reaction mass into two distinct phases and (2) a preformed acidic unsaturated alkyd resin obtained by incomplete reaction of ingredients consisting of polyhydric alcohol, alpha unsaturated alpha beta polycarboxylic acid and up to about 75 mol per cent of the said unsaturated polycarboxylic acid of a polycarboxylic acid selected from the class consisting of saturated aliphatic polycarboxylic acids and aromatic polycarboxylic acids, said alkyd resin having an acid number of at least 40 and not higher than 210, being compatible with the said partial condensation product of (1) and constituting from 5 to 75 per cent by weight of the said dehydrated reaction product.

14. The method which comprises incorporating into a liquid mass consisting of the partial condensation product of ingredients consisting of phenol and an aldehyde and comprising mainly phenol alcohols a preformed acidic unsaturated alkyd resin compatible with said liquid mass and obtained by incomplete reaction of ingredients consisting of polyhydric alcohol and polycarboxylic acid, at least one such acid being essentially an alpha unsaturated alpha beta polycarboxylic acid forming at least 25 mol per cent of the polycarboxylic acid, and causing the said alkyd resin to react with the said liquid mass at a temperature not exceeding substantially 110° C. to form a heat-curable resinous composition, said alkyd resin having an acid number of at least 40 and not higher than 210 and the amount thereof which is incorporated into the said liquid mass being such that it constitutes from 5 to 75 per cent by weight of the heat-cured resinous composition.

15. The method which comprises effecting reaction at a temperature not exceeding substantially 100° C. between ingredients consisting of an aqueous solution of from approximately 1.5 to 3 mols formaldehyde and 1 mol of phenol, said reaction being carried out in the presence of an alkaline catalyst for a period sufficient to form a liquid phenol-formaldehyde partial condensation product but insufficient to cause complete separation of the reaction mass into two distinct phases, incorporating into the said liquid product a preformed acidic unsaturated alkyd resin compatible therewith and obtained by incomplete reaction of ingredients consisting of polyhydric alcohol and polycarboxylic acid, at least one such acid being essentially alpha unsaturated alpha beta polycarboxylic acid forming at least 25 mol per cent of the polycarboxylic acid, and dehydrating the resulting mass at a temperature not exceeding substantially 110° C. simultaneously with effecting co-reaction between the said alkyd resin and the said phenol-formaldehyde partial condensation product, said alkyd resin having an acid number of at least 40 and not higher than 210 and the amount thereof which is incorporated into the said phenol-formaldehyde partial condensation product being such that it constitutes from 5 to 30 per cent by weight of the dehydrated resinous mass.

GAETANO F. D'ALELIO.